United States Patent
Lawrence et al.

(10) Patent No.: US 11,063,875 B2
(45) Date of Patent: Jul. 13, 2021

(54) NETWORK FLOW CONTROL

(71) Applicant: Level 3 Communications, LLC, Broomfield, CO (US)

(72) Inventors: Joseph C. Lawrence, Boulder, CO (US); William R. Power, Boulder, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 16/682,557

(22) Filed: Nov. 13, 2019

(65) Prior Publication Data

US 2020/0084154 A1    Mar. 12, 2020

Related U.S. Application Data

(63) Continuation of application No. 15/440,927, filed on Feb. 23, 2017, now Pat. No. 10,484,288.
(Continued)

(51) Int. Cl.
*G06F 15/16* (2006.01)
*H04L 12/859* (2013.01)
(Continued)

(52) U.S. Cl.
CPC ...... *H04L 47/2475* (2013.01); *H04L 41/0896* (2013.01); *H04L 47/28* (2013.01);
(Continued)

(58) Field of Classification Search
CPC .................................................. H04L 47/2475
(Continued)

(56) References Cited

U.S. PATENT DOCUMENTS 6,765,871 B1 * 7/2004 Knobel ............. H04L 12/40052
370/231
7,069,014 B1 * 6/2006 Thenthiruperai ....... H04L 65/80
455/452.2
(Continued)

OTHER PUBLICATIONS

International Preliminary Report on Patentability, dated Aug. 28, 2018, Intl Appl. No. PCT/US17/019151, Intl Filing Date Feb. 23, 2017; 13 pgs.
(Continued)

*Primary Examiner* — Hamza N Algibhah

(57) ABSTRACT

Aspects of the present disclosure include a content delivery network (CDN) for delivering content associated with a plurality of different types of applications/devices. Using a CDN flow application, a plurality of network flow parameters are generated for content delivery unique to different types of applications or devices. The network flow parameters include customized data transmission rates. The network flow parameters include predetermined settings for transmission control protocol (TCP) connections between the CDN and devices using a TCP flow control mechanism. Upon receiving a content request, the CDN fulfills the content request based upon first network flow parameters. The network flow parameters may be adjusted for each of the plurality of different types of applications/devices. The network flow parameters may be generated based upon requests or based upon the performance of each of the plurality of applications/devices.

12 Claims, 5 Drawing Sheets

Related U.S. Application Data

(60) Provisional application No. 62/298,840, filed on Feb. 23, 2016.

(51) Int. Cl.
| | | |
|---|---|---|
| *H04L 12/24* | (2006.01) | |
| *H04L 12/841* | (2013.01) | |
| *H04L 29/08* | (2006.01) | |
| *H04L 12/801* | (2013.01) | |
| *H04L 12/725* | (2013.01) | |
| *H04L 12/865* | (2013.01) | |

(52) U.S. Cl.
CPC .............. *H04L 67/02* (2013.01); *H04L 67/10* (2013.01); *H04L 67/141* (2013.01); *H04L 45/306* (2013.01); *H04L 47/193* (2013.01); *H04L 47/6275* (2013.01)

(58) Field of Classification Search
USPC ....................................................... 709/225
See application file for complete search history.

(56) References Cited

U.S. PATENT DOCUMENTS

| | | | |
|---|---|---|---|
| 7,516,198 B1 | 4/2009 | Appala et al. | |
| 7,805,156 B1* | 9/2010 | Allen ................ | H04W 72/121 |
| | | | 455/550.1 |
| 8,559,326 B2* | 10/2013 | Lientz ................ | H04L 41/0896 |
| | | | 370/252 |
| 9,270,916 B2* | 2/2016 | Shapira .................... | H04N 5/38 |
| 9,806,991 B2* | 10/2017 | Lucas ................... | H04L 45/302 |
| 10,116,709 B1* | 10/2018 | Kielhofner .......... | H04L 65/1053 |
| 10,218,455 B2* | 2/2019 | Chen ...................... | H04B 10/27 |
| 10,368,110 B1* | 7/2019 | Verbist ............... | H04N 21/2401 |
| 2002/0188732 A1 | 12/2002 | Buckman et al. | |
| 2003/0002484 A1 | 1/2003 | Freedman | |
| 2003/0167270 A1* | 9/2003 | Werme ................ | G06F 11/3466 |
| 2007/0073878 A1* | 3/2007 | Issa .................... | H04L 67/2823 |
| | | | 709/225 |
| 2007/0250560 A1 | 10/2007 | Wein et al. | |
| 2013/0246600 A1* | 9/2013 | Ohnishi .............. | H04L 41/5054 |
| | | | 709/223 |
| 2013/0297819 A1* | 11/2013 | Mittal ................... | H04L 47/781 |
| | | | 709/232 |
| 2014/0018033 A1* | 1/2014 | Luna ................. | H04W 28/0215 |
| | | | 455/405 |
| 2014/0082212 A1 | 3/2014 | Garg et al. | |
| 2014/0149562 A1* | 5/2014 | Xiao ................ | H04N 21/44222 |
| | | | 709/222 |
| 2014/0244849 A1 | 8/2014 | Rizzo | |
| 2014/0282823 A1* | 9/2014 | Rash ....................... | H04L 63/20 |
| | | | 726/1 |
| 2014/0304207 A1* | 10/2014 | Chandrayana .......... | H04L 43/04 |
| | | | 706/48 |
| 2015/0282180 A1* | 10/2015 | Owen ................. | H04L 41/5025 |
| | | | 370/329 |
| 2015/0350601 A1* | 12/2015 | Sinha .................. | H04L 12/1818 |
| | | | 348/14.01 |
| 2016/0094244 A1* | 3/2016 | Alkathami .............. | H04L 9/304 |
| | | | 714/819 |
| 2016/0119833 A1* | 4/2016 | Wu .................... | H04W 36/0022 |
| | | | 455/437 |
| 2016/0211988 A1* | 7/2016 | Lucas ..................... | H04L 45/22 |
| 2017/0164378 A1* | 6/2017 | Gunasekara ............ | H04W 4/00 |
| 2017/0214626 A1* | 7/2017 | Dunlap ................. | H04W 48/20 |
| 2017/0244643 A1 | 8/2017 | Lawrence et al. | |
| 2017/0325120 A1* | 11/2017 | Szilagyi .............. | H04L 41/5067 |

OTHER PUBLICATIONS

International Search Report dated May 5, 2017, Int'l Appl. No. PCT/US17/019151, Int'l Filing Date Feb. 23, 2017; 11 pgs.
Written Opinion of the International Searching Authority dated May 5, 2017, Int'l Appl. No. PCT/US17/019151, Int'l Filing Date Feb. 23, 2017; 11 pgs.
Egilmez, H. E. et al., "OpenQoS: An OpenFlow controller design for multimedia delivery with end-to-end Quality of Service over Software-Defined Networks", In: Signal & Informational Processing Association Annual Summit and Conference (APSIPA ASC), 2012 Asia-Pacific; Retrieved from <http://S3.amazonaws.com/academia.edu.documents/36871147/apsipa.pdf? Dec. 6, 2012 00:00:00. 0, 12 pgs.

* cited by examiner

NETWORK FLOW CONTROL

CROSS-REFERENCE TO RELATED APPLICATIONS

This application is related to and claims priority under 35 U.S.C. § 119(e) from U.S. Patent Application No. 62/298,840, filed Feb. 23, 2016, titled "NETWORK FLOW CONTROL," the entire content of which is incorporated herein by reference for all purposes.

TECHNICAL FIELD

Aspects of the present disclosure relate to a network, such as a content delivery network (CDN), and particularly involve configuring a plurality of network flow parameters for content delivery unique to a plurality of different types of applications and/or devices in order to distribute customized network flow for each of the plurality of different types of applications and/or devices and optimize network flow as a whole.

BACKGROUND

The Internet and the World Wide Web (the "Web") have become ubiquitous. Content providers (publishers) now use the Internet (and, particularly, the Web) to provide all sorts of content to numerous clients all over the world. In order to offload the job of serving some or all of their content, many content providers now subscribe to content delivery networks (CDNs). Using a CDN, content can be served to clients from the CDN (i.e., from one or more servers in the CDN) instead of from the content provider's server(s). In a caching CDN, content may also be cached on some or all of the CDN servers, either before being served or in response to specific requests for that content. Having content cached within edge servers of the CDN enhances the performance of the CDN because the content does not have to be retrieved from origin servers or other locations, which are less efficient than edge servers in providing content.

Numerous forms of content may be served from the CDN. For example, television shows and movies may now be accessed from any number of Web sites, and the shows and movies may actually be served from the CDN. Print newspapers have migrated to the Web and provide portals through which clients operating some form of computing device (e.g., PC, smart phone, or tablet), with a browser may access numerous forms of content, such as short video clips, articles, images, and audio tracks. Software updates and patches, once only provided on disc and mailed to recipients, are now routinely distributed to devices using only network connections, and the updates and patches are delivered from a CDN.

A conventional CDN faces various obstacles with respect to network flow and bandwith when distributing content to devices and/or applications. For example, a device may be operating in a network with bandwith limitations that affect the delivery of content to the device such that the device is confined to receiving content from a limited number of applications. Further, certain types of applications may be expected to operate with high performance and minimal issues. More specifically, it may be desirable to have better content delivery associated with certain types of applications in order to reduce buffering or to enable such applications to perform in real-time. Further, not all applications behave alike. Some types of applications make use of content received from the CDN more efficiently than others and can consequently handle faster data transmission of content from the CDN.

It is with these observations in mind, among others, that various aspects of the present disclosure were conceived and developed.

SUMMARY

A need exists for improved network flow in a content delivery network (CDN). Implementations described and claimed herein address the foregoing problems, among others, by providing systems, methods, and devices for configuring unique network flow control parameters for content delivery associated with specific types of applications/devices in communication with a CDN. Accordingly, one implementation of the present disclosure may take the form of a method of optimizing network traffic flow for a content delivery network (CDN). The method may include the operations of assigning a first network flow parameter for a first application requesting content from the CDN from one or more user devices in communication with the CDN, the first network flow parameter establishing one or more quality of service criteria for a transmission of the requested content associated with providing content to the first application and receiving a request for content at a content server of the CDN from a requesting device, the request received from the first application executing on the requesting device and comprising a host name associated with the first application. The method may also include the operations of applying the first network flow parameter for transmitting the requested content to the requesting device in response to the host name associated with the first application and transmitting the requested content to the requesting device with the first network flow parameters applied to the transmission of the requested content associated with providing content to the first application.

Yet another implementation of the present disclosure may take the form of content delivery network (CDN) networking device comprising at least one communication port for receiving a request for content from a first application executed on a client device, the request comprising an identification of the content, a processing device, and a computer-readable medium connected to the processing device configured to store information and instructions. When the instructions are executed, the processing device performs the operations of assigning a first network flow parameter for a first application, the first network flow parameter establishing one or more quality of service criteria for a transmission of the requested content associated with providing content to the first application, applying the first network flow parameter for transmitting the requested content to the client device in response to the identification of the content associated with the first application, and transmitting the requested content to the client device with the first network flow parameters applied to the transmission of the requested content associated with providing content to the first application.

Yet another implementation of the present disclosure may take the form of a content delivery network (CDN) comprising a first content server. The first content server is configured to assign a first network flow parameter for a first application requesting content form the CDN from one or more user devices in communication with the CDN, the first network flow parameter establishing one or more quality of service criteria for a transmission of the requested content associated with providing content to the first application and receive a request for content at a content server of the CDN from a requesting device, the request received from the first application executing on the requesting device and comprising a host name associated with the first application. The first content server is also configured to identify a type of the first application based on the host name associated with the first application, apply the first network flow parameter for transmitting the requested content to the requesting device in response to the identified type of the first application, and transmit the requested content to the requesting device with the first network flow parameters applied to the transmission of the requested content associated with providing content to the first application.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
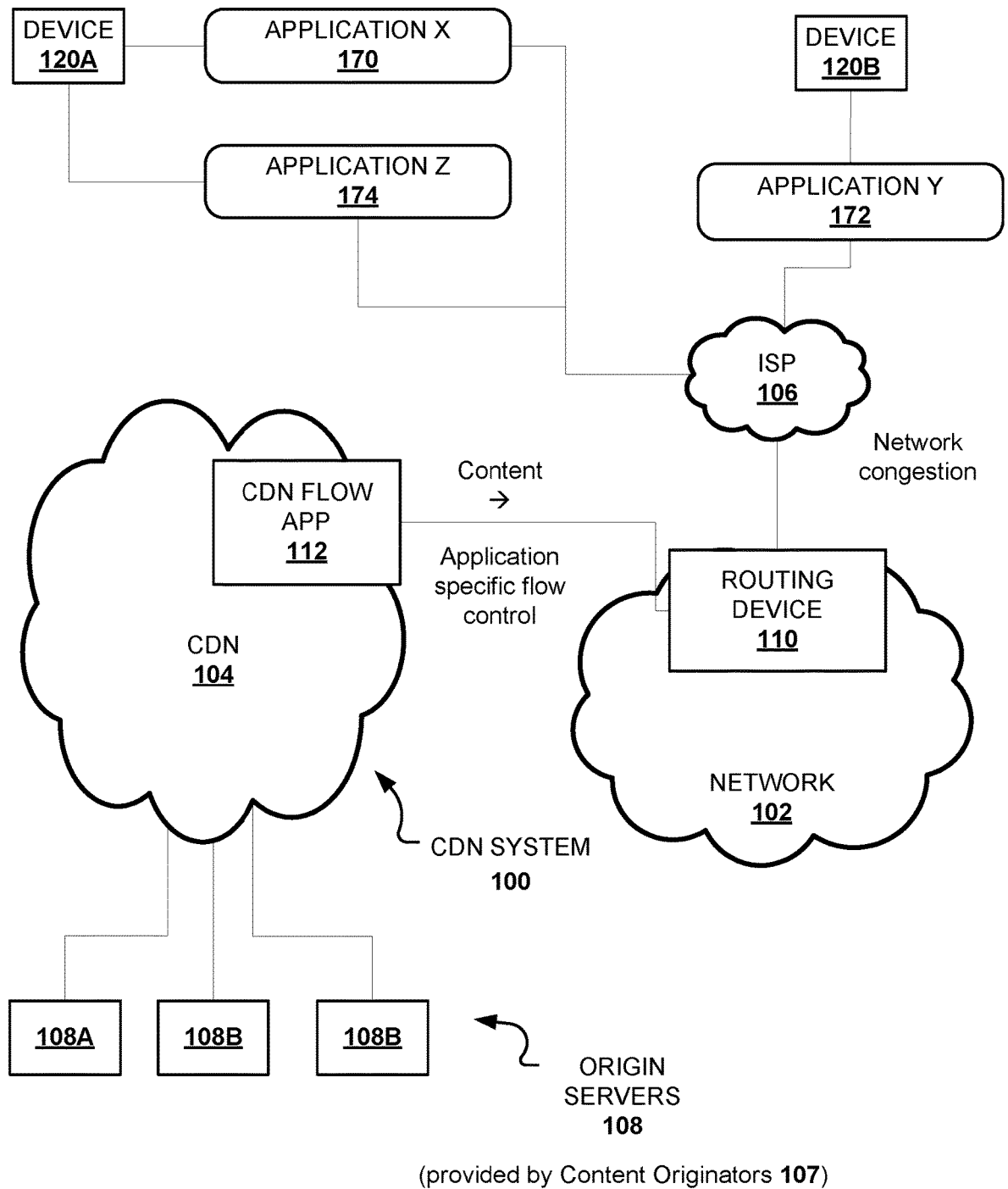
FIG. 1 is an exemplary system view of a content delivery network, according to aspects of the present disclosure.

Aspects of the present disclosure involve systems and methods for configuring network flow parameters at an edge server, a general server, a rack, cluster or other device of a network such as a content delivery network (CDN) to optimize content delivery, in some cases based on a type of content or application and/or device configured to receive and use the content. For example, using a CDN flow application, a plurality of network flow parameters are generated or otherwise controlled for content delivery unique to each of a plurality of application types. The network flow parameters may include, in some instances, customized data transmission rates, along with other types of network flow controls. The network flow parameters may also include predetermined settings or modified algorithms for transmission control protocol (TCP) connections between the CDN and devices/applications receiving content using a TCP flow control mechanism. For example, upon receiving a content request for some particular application or content, the CDN fulfills the content request to a requesting device based upon network flow parameters configured for the type of requested application/device.

Aspects of the present disclosure further include modifying the network flow parameters based upon requests and the performance of the applications/devices.

Content is created and often electronically stored on origin servers from which it may be distributed over networks. Such content may include web content, applications, software patches, downloadable objects, and streaming media. The term "content" as used herein may further mean any kind of data, in any form, regardless of its representation and regardless of what it represents. For example, the term "content" may include, without limitation, static and/or dynamic images, text, audio content, including streamed audio, video content, including streamed video, web pages, computer programs, documents, files, and the like. Some content may be embedded in other content, e.g., using markup languages such as HTML and XML. "Content" includes content which is created or formed or composed specifically in response to a particular request. The term "resource" is sometimes used herein to refer to content.

The content may be utilized by or accessible from one or more applications. Such applications may comprise media players, operating systems, websites, gaming applications, mobile applications, and the like. The applications may request content, and that content may be delivered by a CDN. For example, a video streaming application may make occasional requests for video content and that content request will be directed to the CDN to deliver the content.

A CDN is a type of network comprising a system of distributed servers, edge servers, racks, or clusters that distribute content to a device requesting the content. In order to offload the job of serving some or all of their content, many content originators or other content providers subscribe to CDNs. Using a CDN, content can be served to devices from the CDN (e.g., from one or more servers in the CDN) instead of from the content originators' server(s). Specifically, content originators may share content with a CDN and permit the CDN to manage content requests and distribution. CDNs offer numerous advantages including facilitating content delivery with high traffic across numerous locations. CDNs further implement certain technologies such as complex caching in order to optimize content delivery and are often well equipped to service a wide variety of content requests. Generally, as explained in greater detail below, a content request is often initiated by a device and/or application in communication with the CDN. A content request may also be initiated by software update programs or devices which may request content automatically to receive patches or software updates. As one specific example, a content request may request to stream video media via an application such as a media player application. If a CDN has been configured or tasked to handle content requests for such video media, the request will be routed to and retrieved by the CDN. Thereafter, one or more content servers of the CDN are chosen (based on location, availability, cost, and/or other metrics) to process the request for content and transmit video media content to the device and/or application. Upon receiving the video media content from the CDN, the media player device can stream then play the video on the device. In some cases, it should be understood that content requests processed by a CDN may still involve cooperation from origin servers where certain content is not cached or readily available for delivery via the CDN. In other cases, the CDN may have its own origin server which may be used to obtain content, which may then be locally cached upon use metrics such as volumes of requests, popularity, and the like.

In the course of distributing content, management of network flow from the CDN to devices communicating with the CDN is a key objective. Yet, CDN operators face various obstacles specific to bandwidth and network flow when delivering content. For example, certain types of applications may perform differently at a device executing the applications as content is delivered to the applications. Further, one or more applications may be of higher priority such that it may be desirable to maximum network flow for content requests associated with the higher priority applications. Further still, application providers may desire that the CDN deliver content to applications at consistent and predetermined rates in order to reduce buffering and optimize performance. In some cases, it is also desirable to limit network flow available for content requests associated with certain applications.

As one specific example, it may be desired to stream high definition media via a high-definition (HD) video application. To stream media, the HD video application may initiate one or more content requests from a CDN. To accommodate application specific technical considerations of the HD video application, such as high bandwidth to reduce buffering events at the requesting device, the CDN may fulfill content requests to the HD video application using network flow settings that take into account such technical considerations.

The quality of service through which the content is provided to a requesting device using various aspects of the present disclosure include those primarily based on the application requesting the content (e.g., a media player), the type of content requested, and/or the device running the application (e.g. a tablet running the media player). With respect to applications, for example, a video application executed on the requesting device may be provided network flow criteria commiserate with a video stream, such as high bandwidth, real-time performance adjustment in the content flow, and the like. In general, the flow characteristics are set at the providing server or otherwise within the CDN when the content is requested to provide a particular level or quality of service to the content transmission. In another example, such as for a request for a patch or update download from the CDN, less rigorous flow characteristics may be set by the providing server, like background downloading and low priority queuing within the transmission network. These flow parameters may reflect that the patch download does not require a high bandwidth or may not be as important to the receiving device as other requested content. In this manner, an operator of the CDN may provide various flow characteristics to customers that host content on the CDN that equate to the type of content being made available from the CDN. Further, by controlling the network flow at the CDN, less necessary content may be prevented from overloading the transmission routes from the CDN and slowing the transmission of other content.

In some instances, the network flow control may be utilized during the transmission of content to address changes in performance or capabilities of the network and/or the requesting device. For example, a video application may include functionality to request/retrieve content from a CDN at varying rates as bandwith becomes more available. More specifically, the video application may be programmed to request less content as bandwith limitations are imposed on the video application, but may be programmed to jump back and request more content as sufficient bandwidth becomes available. Such programming may enable the video application to maintain streaming without interruption, but can also result in fluctuations of performance of the video application and consequently result in fluctuations of the end user experience at the device receiving content. Many of these shortcomings are addressed by various aspects of the present disclosure.

FIG. 1 illustrates a CDN system 100 in accordance with various embodiments of the present disclosure. CDN system 100 includes a CDN 104 and a CDN flow application 112. FIG. 1 further illustrates a network 102 and an Internet service provider (ISP) 106, which may also be involved in connecting a device to the CDN 104. Network 102 may include any system capable of passing content and communications between the devices such as, the Internet, a virtual private network, a local area network, a wide area network, a Wi-Fi network, a cellular network, or any combination thereof. "Communicably coupled," or "coupled" as used herein, includes any means of coupling whereby information is passed, such as, e.g., electrically coupled by a wire, optical cable, or wirelessly coupled by a radio frequency or any such wireless media and may include both direct coupling and indirect coupling. Routing includes any action taken to transfer, initiate, terminate, end, and/or direct content and associated data.

The network 102 includes a routing device 110. For simplicity, only one routing device is shown, however, a network may have numerous such devices. The routing device 110 may include any device capable of routing content and associated data to a device and can include one or more of a router, a switch, a session border controller (SBC), a gateway, a gateway controller, a proxy server, or a feature server. In some embodiments, routing device 110 assists with network flow according to instructions provided by CDN 104 and the CDN flow application 112.

The CDN 104 includes one or more of an edge server, a general server, a rack, cluster and combinations thereof for managing and distributing content. The CDN 104 serves content from devices, such as the mentioned servers, based on requests from a device and some associated application. In accordance with aspects of the disclosure, the CDN 104 distributes content to devices 120a and 120b according to logic and instructions provided by the CDN flow application 112, as explained in greater detail below.

Exemplary applications X, Y, and Z are shown and executed by devices 120a and 120b. Application X 170, Application Y 172, and Application Z 174 may request content from CDN 104 in order to stream media or display images or otherwise consume the requested content. While three exemplary applications are shown, it should be understood that devices 120 may execute any number of applications and that devices 120 may execute, simultaneously, one or more applications (e.g., both Application X and Application Z) such that devices 120 may, via one or more applications be making multiple content requests from CDN 104 at any given time. In further embodiments, a single application such as Application X may make content requests associated with different types of content which may be handled by one or more different servers of a CDN such as CDN 104. It should be understood that content requests processed by CDN 104 may still involve cooperation from origin servers 108 where certain content is not cached or readily available for delivery via the CDN 104. In other cases, the CDN 104 may have its own origin server which may be used to distribute content, which may then be locally cached upon use metrics such as volumes of requests, popularity, and the like.

An Internet service provider (ISP) 106 is communicably coupled with one or more devices 120 (120a and 120b) and is further coupled to network 102. For example, FIG. 1 shows device 120a which may be a smartphone, and device 120*b* which may be a laptop coupled to the ISP 106. Devices 120*a* and 120*b* receive content from the CDN 104 via the network 102. ISP 106 enables devices 120*a* and 120*b* to connect to the Internet, access the network 102, and access content from the CDN 104.

The devices 120 are operated by end users of the network 102 and CDN 104. Each of the devices 120*a* and 120*b* may include some form of conventional device such as personal computer, a thin client, a tablet, a smart phone, a set-top box, a cable box, or the like, that is capable of running a browser and providing a user with the ability to request content over a network connection, or some other application suitable for interacting with a network and requesting content therefrom. The devices 120*a* and 120*b* may be a consumer device deployed in a public network, may be an enterprise device deployed in private network or other type of device.

Content Delivery

With CDN system 100, a request for content may originate from an application executed by a computing device, such as devices 120*a* and 120*b*. A network connection, in many instances, will be provided to the devices 120 by the ISP 106 operating one or more resolvers. A resolver, also referred to as a domain name service (DNS) resolver, is a device used to resolve a network address (e.g., translate a domain name into an IP address) for a content request. Generally speaking, the resolver contacts (e.g., queries) a DNS infrastructure, which may involve many different components, to resolve a network address for a content request.

To illustrate some aspects of the disclosure, a user, operating the device 120*a* may utilize Application X 170 to initiate a request to stream video media from the CDN 104. As such, Application X will send out a request for content associated with the video media request. In some embodiments, CDN 104 is configured to retrieve and handle such requests and as such, the request for content is routed to an edge server of the CDN 104 for processing and content delivery. More particularly, servers of the CDN 104 may be located in numerous remote locations. When a user initiates such a request, the DNS will resolve to a particular CDN 104 edge server (based on location, availability, cost, and other metrics) and that server of the CDN 104 will handle the request.

CDN 104 and/or CDN flow application 112 may identify and interpret the request for content based on a host name. A host name may include a domain name such as www.amazingvideo.com or other identifying information. Identifying the source of the content may allow CDN 104 to determine how to process the request as the host name may be associated with a particular application which has been assigned particular network flow parameters. As explained in greater detail below, network flow parameters define how the request should be fulfilled or otherwise provided to the requesting device. Through the network flow parameters, the content delivery is tailored specific to types of applications and/or devices requesting the content. In other embodiments, the network flow parameters are specific to a type of provider of the content. In some embodiments, in the course of managing network flow and fulfilling content requests, CDN 104 can distinguish between content requests by analyzing headers or by using a differentiated services bit set.

Returning to the client request, in order to facilitate content delivery, the device 120*a* may establish a transmission control protocol (TCP) connection with an edge server of the CDN 104 configured to handle the request. Thereafter, Application X 170 may receive the video content from the edge server of the CDN 104 via the TCP connection. In alternate embodiments, content delivery may be achieved via a user datagram protocol (UDP) connection.

Upon receipt by the device 120*a* and/or Application X 170 of the data associated with the video content request, the device 120*a* streams the video content to play a video and the user can begin viewing the video media requested. In one specific embodiment, the requested video content of the present example is hosted entirely on servers of the CDN 104. In the case of the CDN system 100 of FIG. 1, the CDN 104 manages the distribution of content requested from one or more applications or application types such as Application X 170 and Application Y 174.

In FIG. 1, the number of content requests and requesting devices may affect the overall performance of the CDN and intermediate networks (network 102 and ISP 106). For example, a device and/or Application X 170 may make multiple simultaneous content requests requiring the CDN 104 to interpret multiple content requests and return data to the device as efficiently as possible, such as multiple content requests simultaneously from CDN 104 via Application X 170 and Application Z 174. Similarly, requests for content may be made by device 120*b* through Application Y 172. However, providing content from multiple applications to multiple devices through similar network paths (such as through routing device 110 of network 102) can raise various issues. For example, available communication paths from the CDN 104 to the device 120*a* may be limited in quality due to physical limitations of networking devices of the network 102 and ISP 106. In another example, one or more applications (Application X or Z) being executed by the device 120*a* may consume disproportionate amounts of bandwidth from the CDN 104, such as video stream content versus patch downloads. Such issues may cause poor performance at the device 120*a* and/or application and can also lead to network congestion.

As such, it may be desirable to prioritize network flow associated with content delivery for one or more applications requesting content. For example, it may be beneficial to configure consistent, real-time performance for applications that provide streaming media to the device while temporarily or permanently limiting bandwith associated with content delivery for other applications that have less importance or priority—such as applications that provide software patches. In addition, it may be desirable to configure real-time consistent performance for certain applications by limiting the resolution of media files played by applications in order to reduce buffering. It may further be desirable to limit network flow associated with content delivery for applications to a consistent rate in order to ensure that a particular bandwith is consistently available for the application and/or device. Aspects of the present disclosure directly address such considerations.

Optimizing network flow from the CDN 104 to devices and applications enriches the network experience and reflects positively on the operator of the CDN 104. Customizing network flow per applications and/or devices increases the probability that CDN 104 is making optimal use of all network flow available in the network 102.

CDN Flow Application

Figure 2:
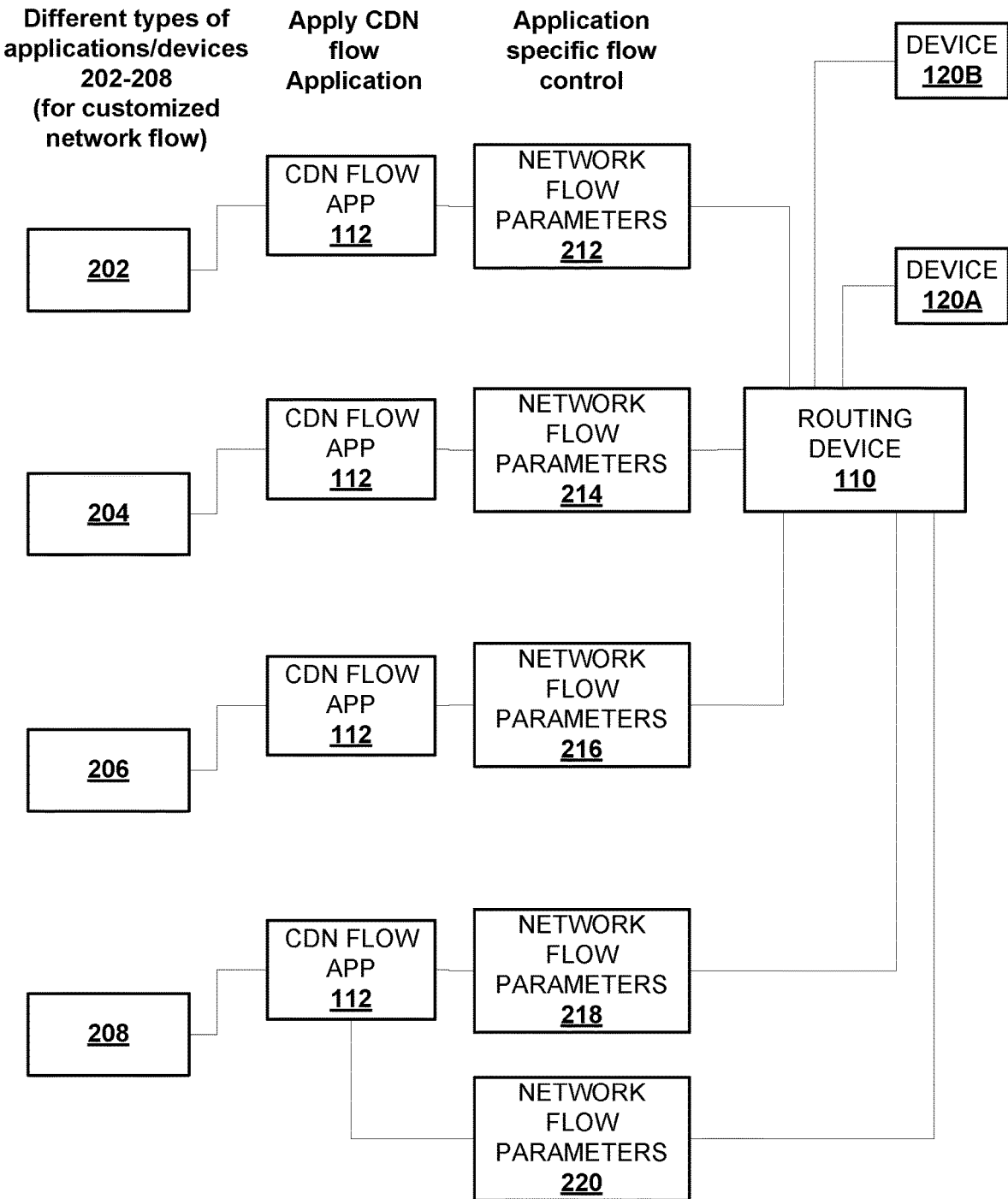
FIG. 2 is an exemplary illustration of configuring or setting network flow parameters for content delivery associated with specific types of applications/devices in a network such as a content delivery network (CDN), according to aspects of the present disclosure.

As shown in FIG. 1, and shown in greater detail in FIG. 2, a CDN flow application (CDN Flow App) 112 may assist with configuring one or more unique network flow parameters in order to specify network flow characteristics from the CDN 104 to devices 120 and applications executed by the devices. CDN flow application 112 may comprise a plurality of instructions and logic stored on one or more servers of the CDN 104 or on a storage device external to but communicably coupled to the CDN 104. The instructions and logic of the CDN flow application 112 may be carried out in software by a processor of one or more servers of the CDN 104, or a separate computing device coupled to the CDN 104. The CDN flow application 112 may also be integrated with servers providing content.

As further detailed below, by tailoring or tuning network flow for a specific type of application/device, such as Application X, Y, or Z, or type of requested content, CDN system 100 optimizes network flow to devices and applications receiving content from the CDN 104. For example, where better performance (such as larger bandwidth and priority queuing) is demanded from certain types of applications, CDN flow application 112 can configure network flow parameters for content delivery associated with those certain types of applications in proportion to the other applications being executed by devices.

Network Flow Parameters

FIG. 2 illustrates an exemplary generation or configuration of certain network flow parameters 212-220 specific to certain content type, applications, and/or devices requesting content to be delivered from the CDN 104. One or more servers of CDN 104 may be responsible for responding to content requests from the various applications/devices 202-208 in communication with the CDN. Thus, the applications/devices 202-208 illustrated in FIG. 2 illustrate various content servers or content-providing devices of the CDN 104. For example, a requesting device to the CDN 104 may be directed to a first content server to retrieve the requested content associated with application 202. A second requesting device, requesting different content, may be directed to a second content server associated with a second application 204. In other embodiments, a single content server may provide all types of content available from the CDN 104 such that the content server may provide application 202 and application 204 to one or more requesting devices. Thus, although illustrated in FIG. 2 as separate applications/devices, it should be appreciated that the requested content for the associated application/device may be hosted or provided by any number of components of the CDN 104. In one embodiment, each of application/device types 202-208 may be associated with a single particular type of application or requesting device as determined through the resolving of the request for content.

As shown in FIG. 2, CDN flow application 112 may generate or configure a plurality of separate unique network flow parameters for content delivery associated with each of the application/device types 202-208. In one embodiment, network flow parameters 212-220 may define specific parameters for content delivery associated with specific applications such as Applications X, Y, and Z executed on the requesting devices 120 of FIG. 1.

Configuring network flow parameters 212-220 at the CDN 104 based on an application requesting content may include any known or hereafter developed flow control mechanism. For example, network flow control may include specifying a predetermined transmission rate unique to one or more of the applications when delivering content to a device. In another example, network flow control may include providing a specific or dedicated bandwidth for delivering the content. In general, any parameter that may affect congestion through the network may be adjusted or set at the CDN 104 through the CDN flow application 112 when a request for content is received from a requesting device. Such parameters may affect or tune the fill path of the transmission, available bandwidth, buffer priority and size, transmission window size, acceptable packet loss, and the like based on the application/device requesting the content.

The CDN 104 or other system then uses the set flow parameters to deliver content to the requesting device. More specifically, bandwith may be restricted for a particular type of application/device to no more than 10 Mbps which is a specific example of setting a flow parameter. In such an example, it may have been determined that a client-side application interface, such as a media player, performs optimally when content delivery is transmitted at a network flow of 10 Mbps and that increases in network flow degrade performance of the media player. In other examples, lower bandwidth may be provided for requested content that is merely being downloaded to the requesting device. In such a situation, packet loss is not important as lost packets may simply be resent from the CDN without a recognized performance effect at the requesting device. Thus, the downloaded content may have a lower bandwidth/performance metrics set when being transmitted from the CDN compared with other types of requested content.

In other embodiments, CDN flow application 112 includes functionality to adjust network flow parameters 212-220 to ensure that content delivery from CDN 104 to a device or application remains consistent with respect to a predetermined transmission rate and network flow. For example, some media player applications may continuously request content delivery at a maximum rate. In such cases, when maximum bandwidth is not available, the media player may lag or buffer, the data transmission rate may drop, but the data transmission rate may increase again upon the media player determining that maximum bandwidth has become available. Such circumstances can result in data transmission rates fluctuating rapidly in speed and flow from the CDN 104 to the application resulting in a respective fluctuation in performance at the media player. CDN flow application 112, by limiting data transmission in the context of content delivery per application from the CDN 104 to a device such as device 120a (to a predetermined consistent rate), increases the probability that the content can ultimately be played and viewed in a consistent format. Consistent data streams further assist the operator of the CDN 104 with management of bandwith and network flow as content is requested from additional separate applications. Consistent network flow may be desired to deliver more consistent seamless delivery of content from CDN 104 for particular applications.

TCP

In some embodiments, configuring network flow parameters includes adjusting flow control settings in a Transmission Control Protocol Internet Protocol (TCP/IP) suite or package associated with connections for a specific application or type of application/device. TCP is a transport protocol in the Internet protocol suite, and is an example of a reliable connection-oriented transport layer protocol operating above the network layer (e.g., Internet Protocol (IP)) and data link layer. TCP connections may be used and modified by CDN flow application 112 to deliver content from the CDN 104 to devices 120 through one or more connecting networks. In other words, the TCP/IP stack provides the transport protocol for transmitting the requested content to the requesting device.

A TCP/IP suite or package includes software components that facilitate modification and configuration of network flow in a TCP connection to address network congestion. For example, a TCP/IP stack may include a flow control mechanism that allows for certain flow controls to be configured at the beginning of the transmission of data from one network component to another. Such flow control may determine the rate at which the content is transmitted through the network to the receiving component, including bandwidth, priority of packets, queue length, and other types of congestion control.

In one particular example, TCP flow control may utilize a variable sized window often referred to as a sliding window-based based flow protocol. A sliding window at the source port of a TCP connection is adjusted based on the window size advertised by the destination port of the TCP connection and the successful transmission of each TCP packet being transmitted. As the window size advertised by the TCP destination port increases, the size of the sliding window at the TCP source port is increased. Conversely, as the window size advertised by the TCP destination port decreases, the size of the sliding window at the TCP source port is decreased. For example, if the TCP destination port buffer is full, the TCP destination port advertises a window size of zero. The TCP source port then stops sending data to the TCP destination port until it receives an advertisement from the TCP destination port indicating a nonzero window size.

When the network becomes congested, for example, when an intermediate system in the network becomes overloaded due to unavailable bandwidth or lack of buffer space, TCP packets may be dropped. This is detected by the TCP source and/or destination port by out of sequence TCP end-to-end flow control sequence and acknowledgement (ACK) numbers. In such a situation, the TCP sliding window flow control mechanism functions as a congestion control mechanism, decreasing the sliding window size at the TCP source port. In some cases, a TCP sliding window flow control mechanism can modify the advertised window to match capacity in the network. In either case, TCP sliding windows can be adjusted dynamically when packet loss occurs or when a receiver is unable to cope with an initial rate of reception of data.

In a similar manner, other aspects of controlling the flow of data packets through a network between two communicating components may be implemented by the CDN in response to a request for content from a particular application or device. For example, one or more aspects of the signaling protocol may control a priority criteria of data packets within a transmission to signal to processing devices that the data packets should be prioritized in a particular way. Similarly, aspects of the TCP signaling protocol may control a queue management at any component along the transmission path. Thus, the signaling protocol utilized to transmit the data packets from the sending component to the receiving component may include one or more mechanisms to establish a quality of service particular to the transmission.

In some embodiments, according to FIG. 2, network flow parameters 212-220, include specialized TCP flow control settings, which are adjusted by CDN flow application 112. In other words, upon receiving a request by an application or device, the CDN 104 may utilize CDN flow application 112 to tune one or more network flow mechanisms, such as TCP connections. In this manner, unique predetermined flow control settings for each of specific application/device types communicating with the CDN 104 may be set by the CDN flow application 112 in order to customize content delivery and network flow.

As a specific example, in some embodiments, a TCP connection may be established between a server of the CDN 104 and a device such as device 120a as an application being executed by the device 120a, requests content from the CDN 104. In such an example, the source port would be a port of a server of CDN 104, and the destination port would be a port of the device 120a. The sliding window-based flow protocol of TCP flow control may then be set by the CDN 104 in response to the particular application for which the requested content is provided. More particularly, a sliding window at the CDN 104 source port of a TCP connection may be adjusted based on the window size advertised by the device 120a destination port of the TCP connection and the successful transmission of each TCP packet being transmitted. In some embodiments, predetermined adjustments to the sliding window may be handled automatically by CDN flow application 112 according to predetermined configurations or instructions. More particularly, the network flow parameters may specify certain predetermined automatic adjustments to the sliding window.

In some instances, using TCP flow control mechanisms, as the window size advertised by the device 120a TCP destination port is increased, the size of the sliding window at the CDN 104 TCP source port may be increased. In some embodiments, CDN flow application 112 may increase the sliding window at the CDN 104 TCP source port for TCP connections for specific applications where it is determined that the application being executed by the device 120a TCP destination port is performing efficiently and is capable of receiving and processing increased amounts of content data from CDN 104. Further, the initial sliding window parameter may be set based on the type of application or device requesting the content. For example, a large window may be set for a video content to ensure less buffering at the receiving device. Conversely, a smaller window may be set for download or patch content as the data provided for such downloads may not need as a high a quality of service in the transmission of the content. This may allow an operator of the CDN 104 to provide different levels of quality of service for the different types of content being provided by the CDN to requesting devices.

In one particular example, CDN flow application 112 may adjust TCP flow control settings to reduce certain network flow characteristics from the CDN 104 to the device 120a. In some embodiments, CDN flow application 112 may decrease the window size advertised by the device 120a TCP destination port. In such cases, such reductions to the window size advertised by the device 120a TCP destination port may result in the CDN 104 reducing the flow of data transmission and content delivery to the TCP destination port. In one instance, decreasing the window size is particularly helpful when, for example, the device 120a is executing an application, and the application is struggling with respect to its ability to make use of content delivered from CDN 104.

In some aspects of the present disclosure, the window size advertised by the device 120a TCP destination port may not necessarily automatically increase or decrease but CDN flow application 112 can manually adjust the size of the sliding window at the CDN 104 TCP source port based upon the needs of the network 102 to adjust network flow from the CDN 104 to the device 120a TCP destination port. More specifically, the CDN flow application 112 can override the automatic adjustment of the advertised window size to modify network flow according to the network flow parameters. Network flow parameters can adjust the TCP sliding window flow control mechanism to customize network flow for particular types of applications/devices.

The TCP sliding window flow control mechanism being controlled by the CDN flow application 112, may function as a congestion control mechanism; decreasing the sliding window size when it is desired for a given application to reduce data flow from CDN 104 to a device requesting content associated with the given application. In other words, using the CDN flow application 112 and network flow parameters, the TCP sliding window flow control application mechanism can dynamically modify a window of the TCP flow control mechanism, per application, to match capacity in the network and the window can further be reduced when packet loss occurs or when the receiver, such as an application and/or device 120*a*, is unable to cope with the rate of reception of data. By reducing or increasing the window size of TCP connections between the CDN 104 and devices 120, the CDN flow application 112 and operator of the CDN 104 ensure that content is being distributed to devices such as devices 120*a* and 120*b* just as fast as the devices 120 and applications initiating the content request can process and make use of such data. In addition, any automatic adjustments to the window of the TCP flow control mechanism can be overridden where network flow parameters demand, for example, constant and consistent network flow. Such tailoring of TCP flow control settings for TCP connections as described can further assist the CDN 104 with other technical considerations. For example, modifying TCP flow control settings can facilitate provisioning constant data transmission rates for content delivery specific to certain applications. Modifying TCP flow control settings can further facilitate greater network flow for content delivery associated with certain applications in proportion to other applications.

In some embodiments, CDN flow application 112 includes preconfigured functionality and algorithms to tune TCP flow control for TCP connections established between the CDN 104 and devices 120. In other embodiments, preexisting TCP flow control algorithms may be adjusted to arrive at the network flow parameters specific to certain types of applications/devices.

Returning to FIG. 2, using CDN flow application 112, a number of network flow parameters 212-220 may be set to configure network flow of content delivery for specific application/device types 202-208. In the case of FIG. 2, network flow parameters 212 are configured for a certain type of application/device 202, network flow parameters 214 are configured for a certain type of application/device 204, network flow parameters 216 are configured for a certain type of application/device 206, and network flow parameters 218 and network flow parameters 220 are configured for a certain type of application/device 208.

FIG. 2 illustrates that more than one set of network flow parameters may be configured for a particular application/device. For example, in one embodiment, more than one set of network flow parameters may be set to define network flow for content delivery associated with a certain type of application (208). Having more than one set of network flow parameters addresses a variety of possible needs. For example, a certain type of application may perform better, and may be able to handle more network flow of content on a laptop (device 120*b*) as opposed to a mobile phone (device 120*a*). Thus, for the type of application 208, network flow parameters 218 may be set and tuned for content delivery to a mobile phone, whereas network flow parameters 220 may be set and tuned for content delivery to a laptop; both network parameters 218 and 220 being associated with a single application type. Having more than one set of network flow parameters per type of application can also address a scenario where an application may need greater network flow during the day, but at night, may be configured to be limited with respect to network flow by the CDN flow application 112 and CDN 104 in order to allow other applications to have greater network flow at night. In some embodiments, three or more sets of network flow parameters may be set for a specific type of application/device depending upon the needs of the CDN 104, and the performance of the application/device.

Figure 3:
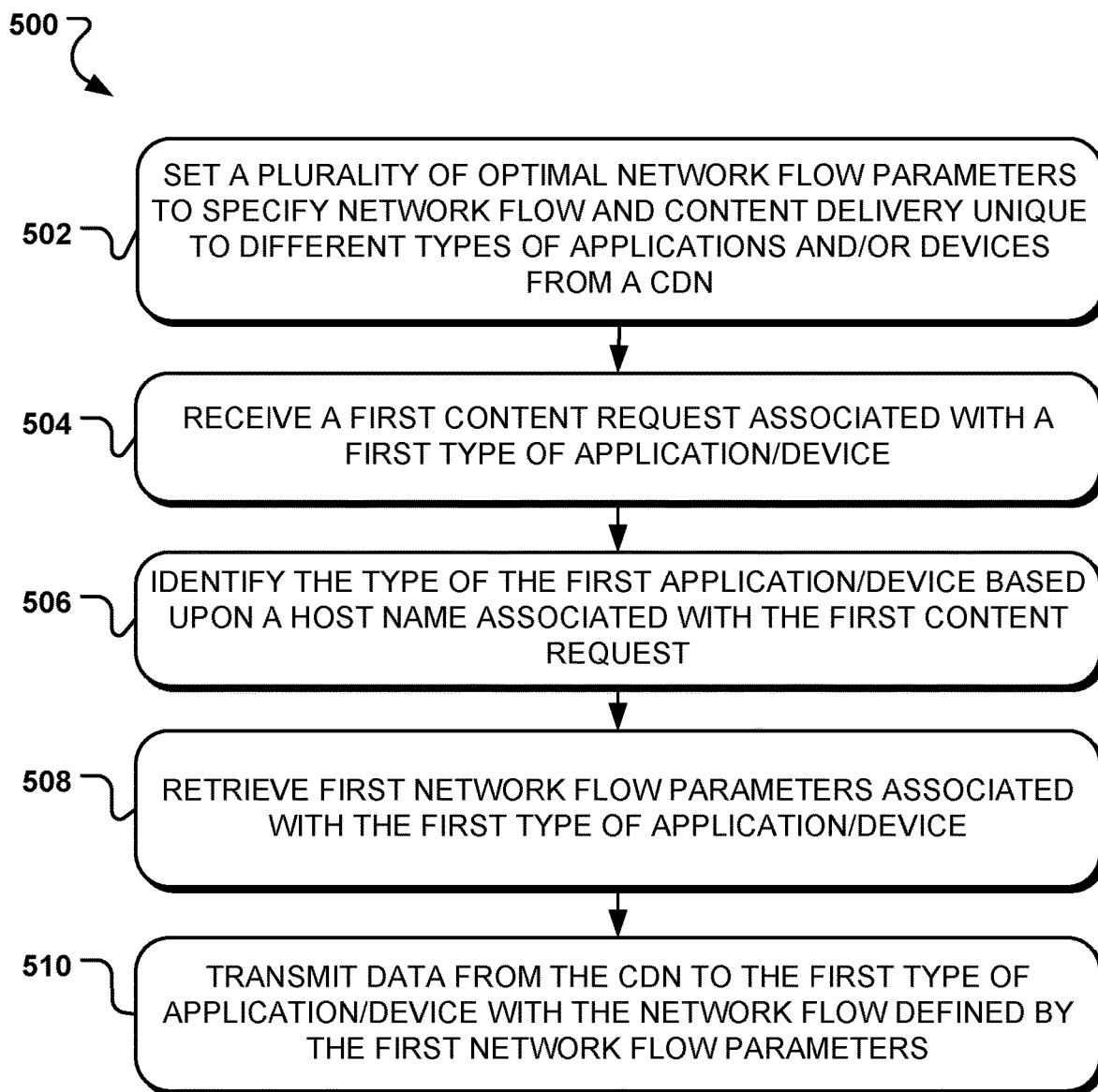
FIG. 3 illustrates an exemplary process flow for setting a plurality of network flow parameters to define content delivery for a plurality of different types of applications and/or devices, according to aspects of the present disclosure.

FIG. 3 illustrates an exemplary process flow 500 for specifying or configuring network flow parameters for content delivery specific to different types of applications and/or devices using a CDN flow application 112 managed by a CDN 104 and fulfilling requests for content using the network flow parameters. Specifically, in block 502, a plurality of network flow parameters, such as network flow parameters 212-220 of FIG. 2 are set or configured for a plurality of specific types of applications and/or devices communicating with a CDN 104. Information about the network flow parameters may be stored in a database of the CDN 104. Requests may be received to prioritize allotment of network flow to one or more types of applications/devices that are of particular importance. Further, requests may be received that network flow for content delivery associated with a respective application/device type where the quality of service of the data flow be limited, decreased, or increased as desired. Such requests may be addressed by adjusting the network flow parameters using the CDN flow application 112. As discussed above, network flow parameters may include customized adjustments to TCP flow control settings, setting predefined network flow caps or limits on network flow allocated to content delivery for a given type of application/device, and the like.

In block 504, a first content request for a first type of application/device is received at the CDN 104. The content request may be, e.g., a request that CDN 104 deliver content to allow a device to stream a video or audio file via a media player associated with the first type of application, a webpage to be viewed on a web browser of the requesting device, or a download request for a patch or new program to be installed on the requesting device. As further shown in block 506, the first type of application may be identified as the requesting type of application based upon a host name associated with the first content request.

In block 508, using CDN flow application 112, a lookup or query is conducted to retrieve network flow parameters that have been assigned, set, or configured for content requests associated with the first type of application/device. In the example of FIG. 3, it is determined that using CDN flow application 112 first network flow parameters have been set for the first type of application/device. Specifically, as shown in FIG. 2, the first type of application/device of FIG. 3 may be the type of application/device 202 and it can be seen that network flow parameters 212 have been set for the first type of application/device which may consequently be retrieved.

In block 510, the CDN 104 fulfills the content request by delivering content to the first application/device type with network flow for content delivery defined by the first network flow parameters, or network flow parameters 212. In some cases, network flow parameters 212 may specify customized TCP flow control settings, decreased network flow, or caps on network flow based on the characteristics and nature of the first type of application/device or preferences of the CDN system 100.

Figure 4:
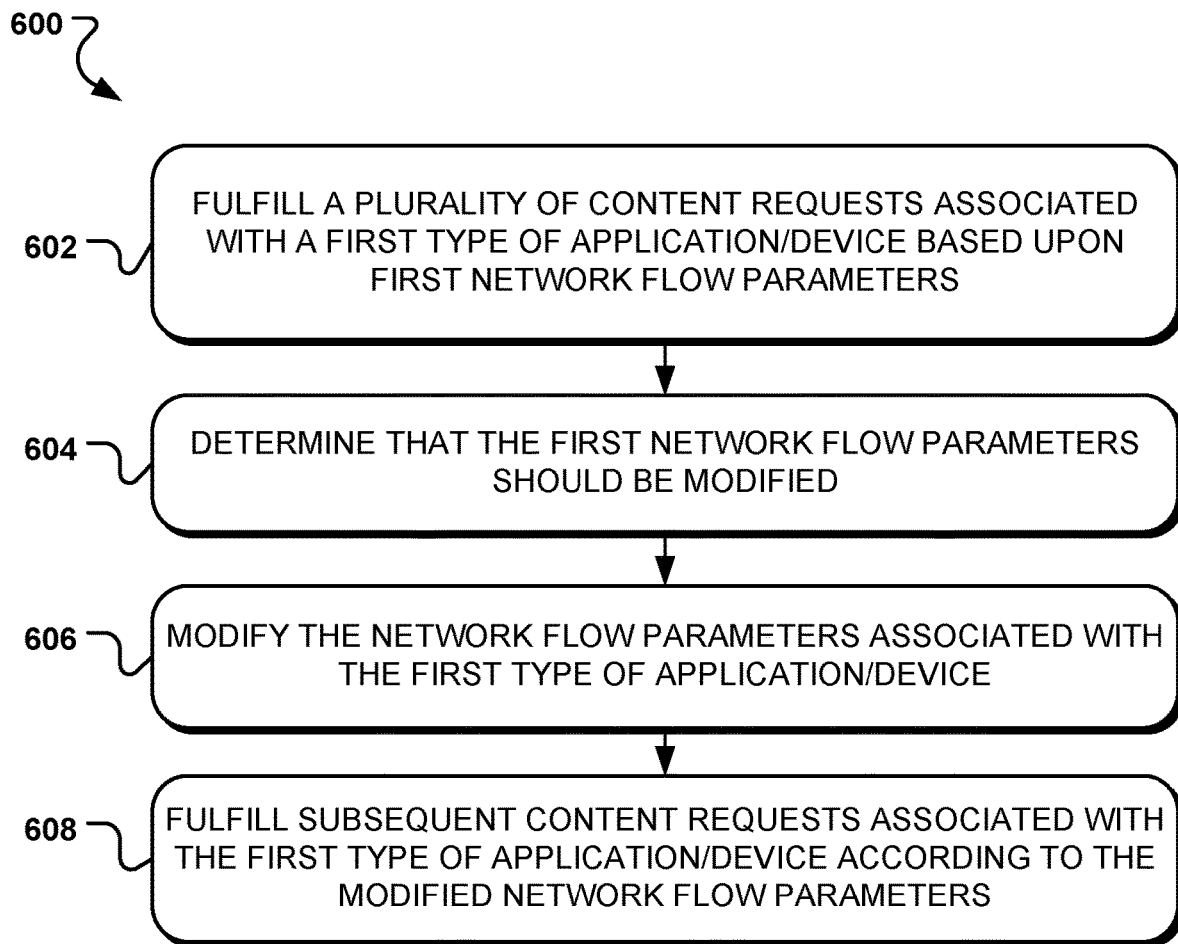
FIG. 4 illustrates an exemplary process flow for modifying a plurality of network flow parameters for content delivery, according to aspects of the present disclosure.

FIG. 4 illustrates an exemplary process flow 600 for adjusting the network flow parameters that have previously been configured or set for one or more specific types of application/devices being managed with respect to content delivery by a CDN 104. In block 602, a plurality of content requests associated with a first type of application/device is fulfilled by a CDN based upon predefined network flow parameters. The first type of application/device may be the application/device type 202 as shown in FIG. 2. The predefined network flow parameters may be network flow parameters 212 of FIG. 2. Network flow parameters 212 customize network flow for content delivery specific to the first type of application/device.

In block 604, it may be determined that the predefined network flow parameters associated with the first type of application/device should be modified. For example, it may be determined that the network flow parameters 212 previously assigned to the first type of application/device (the application type 202) need to be modified or adjusted. Modifying the network flow parameters may include increasing or decreasing network flow for content requests associated with the first type of application/device by adjusting TCP flow control settings for the first type of application/device and/or modifying a maximum data transmission rate or bandwith settings for the first type of application/device. The determination to adjust network flow may be made based upon a variety of factors. For example, a new media player may be deployed that is associated with the first application/device type that can handle increased network flow when devices request content from the CDN 104 via the new media player.

In other embodiments, it may be determined that network flow parameters should be adjusted when the first type of application/device is exceeding or failing to meet a predetermined performance threshold based upon performance data as content is being delivered to the first application/device. The performance data may include e.g., packet loss, instances of network congestion, or instances of buffering. More specifically, initial network flow parameters may be configured for a first application/device type which limit network flow for the first application/device type because the first application/device type exhibits poor performance at a device requesting content, e.g., the first application/device causes network congestion because it does not make use of content delivered from CDN 104 efficiently. Yet, the network flow for the first application/device type can be increased later on when performance data indicates that the first application/device type has improved with respect to receipt and utilization of content delivered from CDN 104.

In block 606, the network flow parameters associated with the first type of application/device are modified or adjusted. Such modifications or adjustments may include increases or decreases with respect to server data transmission caps specific to the first application/device. For example, as part of the network flow parameters, servers of the CDN 104 that handle content delivery requests from devices executing the first type of application/device may be configured to limit network flow to a predetermined rate or a predetermined bandwith. The predetermined rate or bandwith may be increased or decreased in block 606. Further, modifications or adjustments to the network flow parameters may include predetermined modifications to a TCP flow control mechanism.

In block 608, subsequent content requests associated with the first type of application/device are fulfilled according to the modified network flow parameters. It should be understood that the network flow parameters for the first type of application/device can be modified additional times based upon the needs of the CDN 104, the performance of the application or device, or additional requests.

In some embodiments, the adjustment of the network flow parameters may be tailored to include a hysteresis effect to prevent sudden changes to the flow of data to the receiving device. For example, the CDN flow application 112 of FIG. 2 may be configured to adjust the stream of data packets after a predetermined period of time upon receiving an indication of a change in the flow from the receiving device. This may prevent the network devices from receiving quick changes in the flow of data and to possibly overwhelm the devices or cause other types of congestion. In another example, the flow may be tailored to slowly adjust to changes in the network environment. Thus, if the receiving device indicates that more data may be transmitted to the device, the CDN flow application 112 may incrementally increase or decrease the data flow accordingly until the requested upper or lower threshold is reached. This slow adjustment to the data flow may further lessen the impact on the network devices for changes or adjustments to the network flow.

Figure 5:
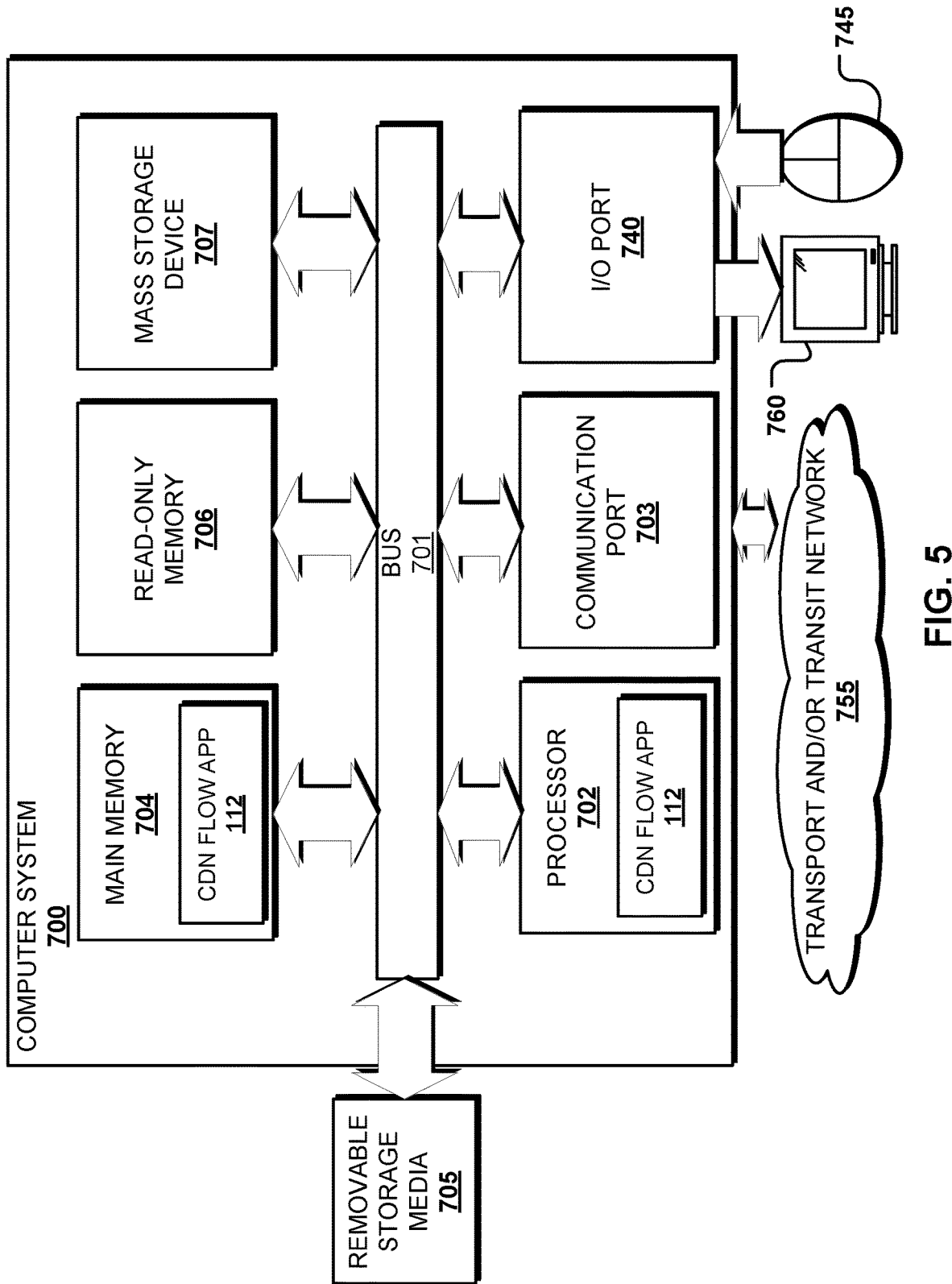
FIG. 5 illustrates an example of a computing system that may implement various services, systems, and methods discussed herein.

FIG. 5 is an example schematic diagram of a computing system 700 that may implement various methodologies discussed herein. For example, the computing system 700 may comprise one or more servers of the CDN 104 used to execute the CDN flow application 112 and configure network flow parameters for specific applications, or, it may comprise a computing system used by end users to communicate with the CDN 104 and receive content for one or more applications. The computing system 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer system 200 connects. Computing system may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 is encoded with a CDN flow application 112 that supports functionality as discussed above and as discussed further below. For example, in one embodiment, the CDN flow application 112 may include or otherwise implement the various processes and/or instructions for configuring network flow parameters for specific applications as described herein. The CDN flow application 112 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the CDN flow application 112 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of optimizing network traffic flow for a content delivery network (CDN), comprising:

assigning a first network flow parameter and a second network flow parameter for a first application requesting content from the CDN from one or more user devices in communication with the CDN, the first network flow parameter establishing a first set of one or more quality of service criteria and the second network flow parameter establishing a second set of one or more quality of service criteria for a transmission of the requested content associated with providing content to the first application;

receiving a request for content at a content server of the CDN from a requesting device, the request received from the first application executing on the requesting device and comprising a host name associated with the first application;

identifying a type for the requesting device;

applying one of the first network flow parameter and the second network flow parameter for transmitting the requested content to the requesting device in response to the host name associated with the first application based on the identified type for the requesting device; and transmitting the requested content to the requesting device with the applied network flow parameters applied to the transmission of the requested content associated with providing content to the first application, wherein the requested content is a video file and the application of one of the first network flow parameter and the second network flow parameter comprises a first bandwidth for transmitting the requested content to the requesting device using the CDN, and the requested content is a data file and the application of the applied network flow parameter comprises a second bandwidth for transmitting the requested content to the requesting device using the CDN, the second bandwidth being less than the first bandwidth.

2. The method of claim 1 further comprising:

establishing a transmission control protocol/Internet protocol (TCP/IP) connection with the requesting device; and wherein the first network flow parameter and the second network flow parameter comprises a TCP/IP flow control parameter.

3. The method of claim 1 wherein the host name comprises a uniform resource locator (URL) associated with the first application and the method further comprises identifying a type of the first application based on the URL associated with the first application.

4. The method of claim 1 wherein one of the first network flow parameter and the second network flow parameter comprises network server data transmission caps to limit data transmission to a predefined rate during transmission of the requested content.

5. The method of claim 1 wherein one of the first network flow parameter and the second network flow parameter comprises a queue priority for data packets associated with the transmission of the requested content associated with providing content to the first application.

6. The method of claim 1, wherein the first network flow parameter is applied if the type for the requesting device is a mobile phone and the second network flow parameter is applied if the type for the requesting device is a laptop computer.

7. A content delivery network (CDN) networking device comprising:
at least one communication port for receiving a request for content from a first application executed on a client device, the request comprising an identification of the content;
a processing device; and
a computer-readable medium connected to the processing device configured to store information and instructions that, when executed by the processing device, performs the operations of:
assigning a first network flow parameter and a second network flow parameter for a first application, the first network flow parameter establishing a first set of one or more quality of service criteria and the second network flow parameter establishing a second set of one or more quality of service criteria for a transmission of the requested content associated with providing content to the first application;
identifying a type for the client device;
applying one of the first network flow parameter and the second network flow parameter for transmitting the requested content to the client device in response to the identification of the content associated with the first application based on the identified type for the client device; and
transmitting the requested content to the requesting device with the applied network flow parameters applied to the transmission of the requested content associated with providing content to the first application, wherein
the requested content is a video file and the application of one of the first network flow parameter and the second network flow parameter comprises a first bandwidth for transmitting the requested content to the requesting device using the CDN, and
the requested content is a data file and the application of the applied network flow parameter comprises a second bandwidth for transmitting the requested content to the requesting device using the CDN, the second bandwidth being less than the first bandwidth.

8. The networking device of claim 7 wherein the identification of the content comprises a host name within a uniform resource locator (URL) associated with the first application.

9. The networking device of claim 7 wherein the processing device is further configured to perform the operations of:
identifying a type of the first application based on the URL associated with the first application.

10. The networking device of claim 7 wherein the processing device is further configured to perform the operations of:
identifying the type of the client device based on the URL associated with the first application.

11. The networking device of claim 7 wherein the processing device is further configured to perform the operations of:
establishing a transmission control protocol/Internet protocol (TCP/IP) connection with the client device; and
wherein one of the first network flow parameter and the second network flow parameter comprises a TCP/IP flow control parameter.

12. A content delivery network (CDN) comprising:
a first content server, the first content server including:
at least one processor; and
at least one storage device coupled to the processor, the at least one storage device having stored thereon a set of instructions that, when executed by the processor, cause the first content server to:
assign a first network flow parameter and a second network flow parameter for a first application requesting content form the CDN from one or more user devices in communication with the CDN, the first network flow parameter establishing a first set of one or more quality of service criteria and the second network flow parameter establishing a second set of one or more quality of service criteria for a transmission of the requested content associated with providing content to the first application;
receive a request for content at a content server of the CDN from a requesting device, the request received from the first application executing on the requesting device and comprising a host name associated with the first application;
identify a type for the requesting device;
apply one of the first network flow parameter and the second network flow parameter for transmitting the requested content to the requesting device based on the identified type for the requesting device and in response to the identified type of the first application; and
transmit the requested content to the requesting device with the first network flow parameters applied to the transmission of the requested content associated with providing content to the first application, wherein
the requested content is a video file and the application of one of the first network flow parameter and the second network flow parameter comprises a first bandwidth for transmitting the requested content to the requesting device using the CDN, and
the requested content is a data file and the application of the applied network flow parameter comprises a second bandwidth for transmitting the requested content to the requesting device using the CDN, the second bandwidth being less than the first bandwidth.

* * * * *